United States Patent [19]

Brown et al.

[11] 4,249,141

[45] Feb. 3, 1981

[54] LASER SYSTEMS USING PENTAPHOSPHATE ACTIVE MEDIUMS

[75] Inventors: David C. Brown, Fairport; Jack Wilson, Rochester, both of N.Y.

[73] Assignee: University of Rochester, Rochester, N.Y.

[21] Appl. No.: 913,920

[22] Filed: Jun. 8, 1978

[51] Int. Cl.$^3$ .............................................. H01S 3/16
[52] U.S. Cl. .............................................. 331/94.5 F
[58] Field of Search ............... 331/94.5 F, 94.5 G, 331/94.5 L, 94.5 E, 94.5 C

[56] References Cited

U.S. PATENT DOCUMENTS

| | | | |
|---|---|---|---|
| 3,233,189 | 2/1966 | Guggenheim et al. | 331/94.5 F |
| 3,579,142 | 5/1971 | Smiley | 331/94.5 C |
| 3,609,585 | 9/1971 | Hufnagel | 331/94.5 C |
| 3,813,613 | 5/1974 | Danielmeyer et al. | 331/94.5 F |
| 3,833,805 | 9/1974 | Naiman et al. | 331/94.5 F |
| 3,863,177 | 1/1975 | Damen et al. | 331/94.5 F |
| 4,063,191 | 12/1977 | Ault et al. | 331/94.5 G |

Primary Examiner—William L. Sikes
Assistant Examiner—León Scott, Jr.
Attorney, Agent, or Firm—Martin Lu Kacher

[57] ABSTRACT

Laser systems in which efficiency and high repetition rate operation are obtained utilize an active laser medium consisting of pentaphosphate with high concentration doping of a rare earth such as neodymium and a pumping means in optical contact with the active medium which produces pump radiation confined to a band which essentially overlaps the absorption band of the laser medium. An active mirror configuration is described with thin layer of pentaphosphate active medium on one side of a substrate which is transmissive to the pump radiation. The pump radiation is provided by an excimer laser or by a semiconductor converter layer which is excited by flash lamps. The laser medium may be segmented with the space between segments occupied by material absorptive of amplified spontaneous emission wavelengths. The laser system is especially useful in laser fusion systems.

17 Claims, 6 Drawing Figures

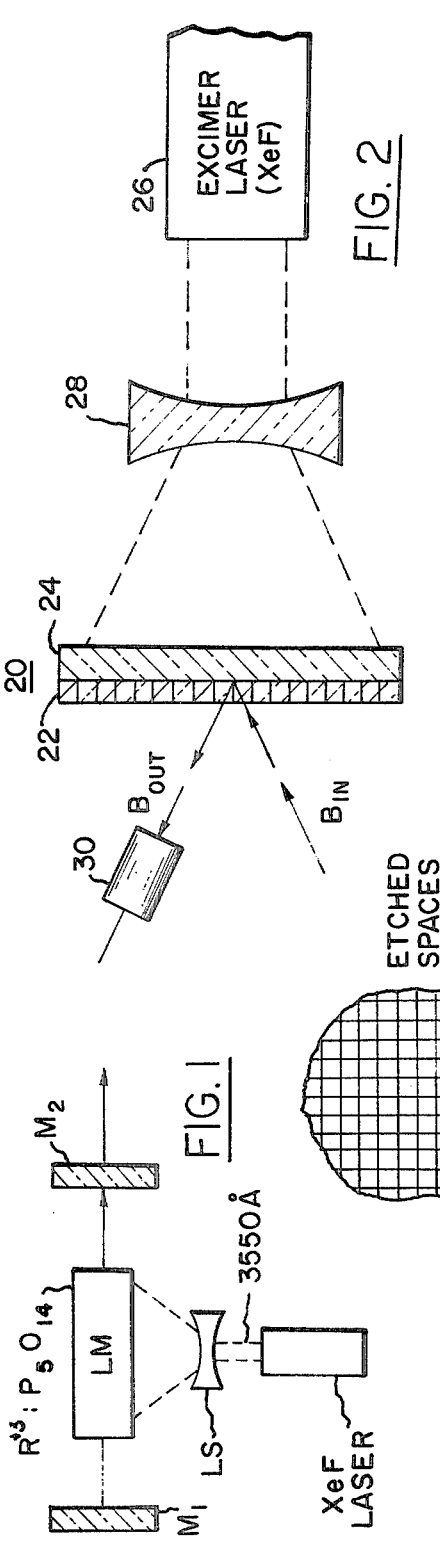
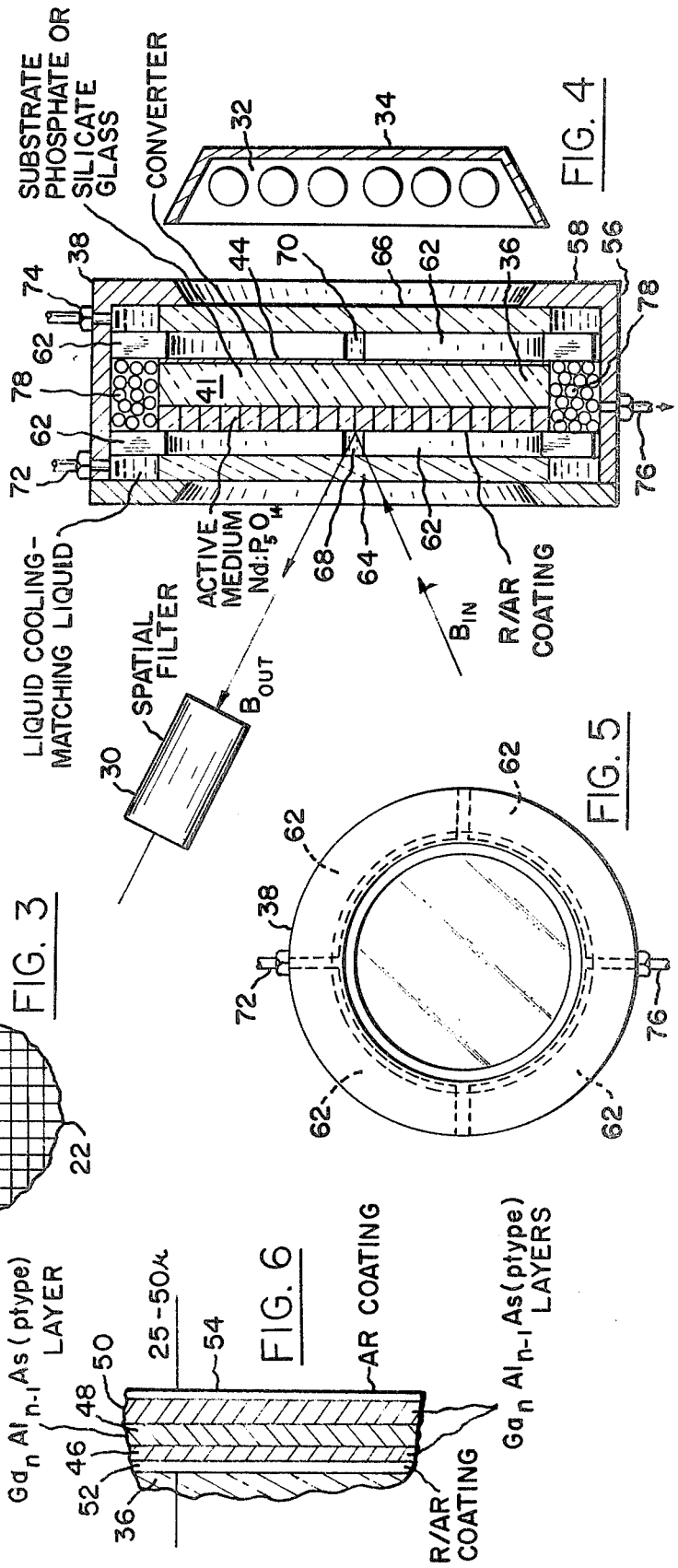

LASER SYSTEMS USING PENTAPHOSPHATE ACTIVE MEDIUMS

The present invention relates to laser systems and particularly to laser systems having pentaphosphate doped with high concentration of rare earth as the active laser medium.

The invention is especially suitable for use where high efficiency and high repetition rate operation are desired with laser outputs of wavelengths in the near infrared-visible region for use in laser fusion systems.

Silicate and phosphate glasses doped with neodymium have best provided the energy, wavelength and other parameters needed in a fusion laser. The efficiency of such glass laser has been low and the repetition rate has also been low. The low efficiency and low repetition rate is a consequence of the use of xenon (Xe) flash lamps which have a broad band radiation output, which is only partially absorbed by the Nd:Glass, and of the large amount of heat which is deposited by these flash lamps and which must be removed between shots. In both silicate and phosphate glass, the doping concentration is limited by concentration quenching effects. Other effects, including fluorescence decay losses, amplified spontaneous emission and parasitic oscillations also limit the efficiency.

Recently pentaphosphate crystals and glasses have been developed which have allowed high Nd doping (see H. G. Danielmeir, et al, Journal of Crystal Growth, 22, 298–302 (1974); S. R. Chinn, et al, Laser Focus, May (1976); I. A. Bondar, et al, Soviet Journal Quantum Electronics, Vol. 7, No. 2, 167 (1977); and S. R. Chinn and W. K. Zwicker, Appl. Phys. Letters, Vol. 31, No. 3, 178 (1977)). The efficiency of the laser system and the repetition rate obtainable is a function of the pumping means which are utilized. By pumping the pentaphosphate active medium with radiation that is confined to bands which overlap the strong absorption wavelength of the medium, high efficiencies result. Further, through the use of geometries involving small thicknesses of the medium the heat load thereon is reduced, decreasing the thermal cycling time and increasing the repetition rate. Even with pumping at the strong absorption wavelength there is a quantum defect due to the energy difference between the photons at the laser output wavelength and the pumping photons which ends up as a heat load or spontaneous emission (fluorescence). When the fluorescence is maximized the heat load is minimized. The geometry of the laser medium in the form of segments with spaces therebetween occupied by material absorptive of the wavelengths of the spontaneous emission prevents amplification of the spontaneous emission.

An excimer laser having an output which essentially overlaps the strong absorption peak of the rare earth doping material of the pentaphosphate laser medium can be used for pumping. Alternatively, a solid state converter which translates high flux density pump energy from xenon flash lamps to output wavelengths which are confined to the absorption wavelengths of the rare earth in the pentaphosphate medium may be used. Such converters may be semi-conductor layers with the converter layer and a layer of pentaphosphate laser medium being disposed in optical contact as on opposite sides of a substrate. The converter layer may consist of thin film of Ga Al As; such semiconductor converters being described in Zh. I. Alferov, et al, Soviet Journal Quantum Electronics, Vol. 6, No. 6, 734 (1976). The layer is preferably $Ga_nAl_{1-n}As$, where n can vary from 0 to 1, thereby enabling changing the stochiometry and bandgap of the layer. Some mention has been made of the use of excimer laser pumps (see Appl. Phys. Lett. 32 1, 31, Jan. 1, 1978).

Accordingly, it is an object of the present invention to provide an improved laser system.

It is a further object of the invention to provide an improved active mirror laser.

It is a still further object of the present invention to provide an improved laser system having efficient, high repetition rate operation.

It is a still further object of the present invention to provide an improved laser system in which energy storage is maximized in the laser medium with minimum thermal effects so as to enable obtaining high repetition rates.

It is a still further object of the present invention to provide an improved laser utilizing a rare earth doped pentaphosphate laser material which is pumped at a wavelength essentially overlapping the strong absorption wavelength of the absorption spectra of the laser medium. Such a pump may comprise an excimer laser or a semiconductor converter in the pump system.

The foregoing and other objects, features and advantages of the invention as well as presently preferred embodiments thereof become more apparent from a reading of the following description in connection with the accompanying drawings in which:

FIG. 1 is a schematic diagram of a laser system embodying the invention;

FIG. 2 is a diagrammatic sectional view of an active mirror laser system embodying the invention;

FIG. 3 is a fragmentary front view of the laser medium in the active mirror shown in FIG. 2;

FIG. 4 is a sectional view diagrammatically showing an active mirror laser amplifier with a semiconductor converter in accordance with another embodiment of the invention;

FIG. 5 is a side view of the active mirror laser amplifier unit shown in FIG. 4; and FIG. 6 is an enlarged sectional view of the semiconductor converter of the active mirror shown in FIGS. 4 and 5.

Referring to FIG. 1 there is shown a laser system where the active laser medium LM is a rare earth pentaphosphate consisting of material having the composition $R^{+3}:P_5O_{14}$, where $R^{+3}$ is a rare earth with a valence of 3, for example neodymium (No), praseodynium (Pr), holmium (Ho), europium (Eu), samarium (Sm), terbium (Tb), dysprosium (Dy), and erbium (Er). The laser medium LM is located in a resonant cavity defined by a totally reflecting mirror $M_1$ and partially reflecting mirror $M_2$. The output of a excimer laser is focussed by a suitable lens LS on to the pentaphosphate medium. An excimer laser is a gas laser where emission takes place from molecules found in an electronically excited state but not in the ground state. The excimer laser may have electron beam excitation or electrical discharge excitation. The excimer laser is selected to provide excimer output wavelengths which are confined to wavelengths where the laser medium has strong absorption. Xenon fluoride (XeF) excimer lasers are discussed below. Other excimer lasers such as krypton fluoride (KrF) and Argon fluoride (ArF) may be used depending upon the output wavelength desired. A KrF excimer laser produces an output wavelength centered at 2490 Å. Excimer output wavelengths spanning the range from 1720 Å (Xe$_2$) to 5580 Å (KrO, ArO) are available. Excimer output wavelengths which coincide or substantially overlap the absorption spectra of the laser medium are preferred. Rare earth pentaphosphates doped with Nd, Sm, Tb, Dy, Ho, Eu and Er, have strong absorption spectra at about 3550 Å. A xenon fluoride (XeF) laser provides a pump output in a wavelength band centered at 3530 Å which overlaps the strong absorption spectra of for example, the above named rare earths (see G. H. Dieke, et al, Appl. Optics, 2, 675 (1963)). A Raman active medium may be used to shift the pump wavelength from an excimer laser. For example, in the event that the rare earth pentaphosphates doped with Pr is used as the laser medium, a Raman active medium may be used to shift the pump wavelength from the XeF excimer laser to coincide or overlap the absorption spectra. For further information respecting Raman shifting reference may be had to N. Djeu, et al, Appl. Phys. Letters, Vol. 30, No. 9, 473 (1977). For example, where a pentaphosphate doped with Pr or Tm is used, a KrF excimer laser which has an output overlapping their strong absorption spectra at 2490 Å may be used. At the present time the laser medium is preferably a crystal or glass of Nd:P$_5$O$_{14}$, inasmuch as Nd:pentaphosphate emits laser radiation at a wavelength between 1.05 and 1.06 microns which wavelength is the near infrared and meets the requirement for fusion laser systems for visible or near infrared wavelengths. Ho, Eu, and Pr also emit visible or near infrared, specifically 7500 Å for Ho, 6645 Å for Eu, and 6000 Å for Pr. Of course this invention is applicable to these and other wavelengths.

Where the laser medium LM is Nd:P$_5$O$_{14}$ in the form of a crystal, rectangular in shape (e.g., 2 millimeters by 2 millimeters by 10 millimeters) the excimer pump laser is a xenon fluoride laser. The mirror M$_1$ is 100% reflecting while M$_2$ is 94% reflecting. The output laser beam which passes through the mirror M$_2$ is between 1.05 and 1.06 micron.

The physics of the XeF pump laser, Nd:pentaphosphate system exemplified in FIG. 1 may be understood from the energy levels for Nd$^{+3}$. Absorption of the XeF radiation is via the transition ($4_{I9/2} \rightarrow 4_{D3/2}$). Deexcitation of those levels takes place from a combination of radiative and multi-phonon decay to the $4_{F3/2}$ state. From the $4_{F3/2}$ state, decay takes place on three principal transitions ($4_{F3/2} \rightarrow 4_{F13/2}$), ($4_{F3/2} \rightarrow 4_{I11/2}$), ($4_{F3/2} \rightarrow 4_{I9/2}$) with emission at 1.35 micron, 1.05 micron, and 0.88 micron respectively. Laser amplification or emission at about 1.05 microns (between 1.05 and 1.06 microns) occurs due to the combination of long radiative life-time and moderately high stimulated emission cross section for that transition.

One reason for the high efficiency of the rare earth pentaphosphate system is believed to be due to the manner in which the rare earth appears in the lattice. Unlike classical glass compositions (silicate or phosphate glasses), in the pentaphosphate the rare earth (e.g., Nd) is part of the lattice and is very well shielded from its surroundings. Consequently, a rare earth ion can be present in each molecule and 100% doping may be obtained. It is preferable to use very large dopings typically 40% by weight of the rare earth. The composition and the percentage by weight of doping may be varied by substituting an inactive rare earth in the composition. For example, the composition Nd$_x$La$_{1-x}$: P$_5$O$_{14}$ allows La (lanthanum) to be substituted for the Nd with the result that the Nd doping may be continuously varied from zero to 40% by weight; thus emabling the absorption depth or thickness of the active medium to be varied. It will be appreciated that any valence +3 rare earth, such as those mentioned above, may be substituted for the Nd. As noted above the rare earth pentaphosphate may be either a crystal or a glass.

FIG. 2 illustrates a laser system using an active mirror laser 20 which may be a slab, preferably a disc up to 100 centimeters in diameter. The active laser medium 22 is a rare earth pentaphosphate, suitably Nd:pentaphosphate glass on one face of a glass substrate 24. The substrate may be silicate or phosphate glass which is transmissive to the pump wavelength. This pump wavelength is the XeF emission from an XeF excimer laser 26. Optionally, an optical system, shown schematically as a lens 28 may be used to couple the pump beam to the medium layer 22. A pump beam wide enough to encompass substantially all of the active medium layer 22 is preferred. The pump means provided by the excimer laser 26 is thus brought into optical contact with the active mirror 20 at the rear face of the substrate disc 24 and excites the active mirror to amplify or emit a beam indicated as B$_{out}$ and B$_{in}$ which makes a double pass through the active medium layer 22. A spatial filter 30 is provided so as to enable the active layer 22 to be segmented as will be discussed more fully below. The need for a spatial filter depends upon the pulse length of the laser beam. For large (nano-second) pulse lengths, say 1 to 10 nano-seconds, the large spatial frequencies associated with segmentation are not objectionable. For short pulse lengths, say 50 to 200 picoseconds, spatial filters such as the spatial filter 30 should be used to avoid damage to optical components from non-linear effects. While the beam which is amplified or emitted by the active mirror 20 is indicated as a single line, it will be appreciated that the active mirror is a large aperture device and beam width may be much larger and focussed down from the output active mirror of an active mirror array in the beam lines of a laser fusion system so as to uniformly irradiate a laser fusion target.

Inasmuch as the absorption depth for rare earth pentaphosphate laser mediums is short and typically in the range of 50 to 200 microns, the layer 22 may be thin. A thickness of about 0.1 centimeter may be used. This thickness reduces the time for heat removal from the layer and thus enables the repetition rate of the laser to be increased over typical active mirror or disc type lasers which typically have repetition rates of one firing or shot per half hour for active mirrors and even in excess of two hours for disc types. The layer 22 is applied to the front face of the substrate 24, preferably upon a coating which is reflective at the laser wavelength (1.05 to 1.06 micron for a Nd:pentaphosphate layer) and anti-reflective at the XeF laser output (in a band of wavelengths centered at 3530 Å). The pentaphosphate layer 22 may be grown in epitaxial layers or mechanically attached to the substrate by a mounting (not shown in FIG. 2,—but which may be of the type shown in FIGS. 4 and 5) which encompasses the rim of the pentaphosphate layer and the rim of the substrate 24. By rim is meant the outer edge of the layer 22 and substrate 24.

At the thicknesses of the active pentaphosphate layer 22 which are described above, the stored energy density in the medium increases to a point where amplified spontaneous emission may be significant. Such emission is reduced by segmenting the layer 22 in the form of adjacent segments such as a grid of segments shown in FIG. 3. This grid may be provided by etching the pentaphosphate layer after it is deposited leaving spaces between each segment. These spaces are filled with material which is absorptive at the wavelengths of the amplified spontaneous emission (ASE). As noted above in the case of Nd:pentaphosphate, these wavelengths are at about 1.35, 1.06 and 0.88 microns. To this end a liquid which also serves to cool the front face of the laser 22 may be maintained in contact therewith. Such a liquid may for example be a ferric chloride solution or a solution of tricresyl phosphate or a solution of zinc chloride. Other liquids such as described in Dube, et al, Appl. Opt., April 1974, 699, may also be used. Alternatively a solid material may be placed in the spaces between the segments. Any material which is approximately totally black to the ASE wavelengths may be used, such as metallic blacks. Metallic blacks are mixtures of metals and metal oxide, for example: nickel and nickel oxide; chrome and chrome oxide; and copper and copper oxide.

The amplified spontaneous emission and parasitics are effectively absorbed by the absorbing liquid or solid material in the spaces between the segments, thus overcoming the depumping effects which would deplete the inversion and reduce the gain of the active mirror.

Referring to FIGS. 4 and 5 there is shown an active mirror system where the pumping means is provided by xenon flash lamps 32 in a reflector 34 in optical contact with one side of an active mirror held in a mounting 38. The active mirror consists of a substrate which may be in the form of a disc of phosphate or silicate glass with a segmented layer 42 of rare earth pentaphosphate material, such as neodymium pentaphosphate as described in connection with FIG. 2. The segmentation may be in an array such as a grid. The grid suitably is in the form of approximately 0.1 centimeter squares (i.e., each segment is a 0.1 centimeter square). The thickness of the layer 42 may also be approximately one-tenth centimeter.

On the rear face of the substrate 36 there is deposited as by sputtering or epitaxial growing a semi-conductor converter 44. This converter may be of the type described in the above-referenced article by Alferov et al. The converter is shown in greater detail in FIG. 6. It consists of three layers of P-type Ga Al As semi-conductor material 46, 48 and 50. Between the layer 46 and the rear surface of the substrate 36 there is deposited a thin film coating 52 which is anti-reflective at the pump wavelengths but reflective at the wavelengths (e.g., 1.05 to 1.06 microns for Nd:P$_5$O$_{14}$) of the laser radiation. Any laser radiation which passes through the reflective/anti-reflective coating between the front face of the substrate 36 and the laser medium 42 will be reflected by the coating 52. Another coating 54 which is anti-reflective at the pump wavelengths is deposited on the rear face of the converter 44. The coatings 52 and 54 also provide index matching since the index of refraction of the semi-conductor material is high and may lead to substantial reflection losses in the absence of the coatings 52 and 54.

The mounting 38 for the active mirror 41 consists of a ring 56 having a circular flange 58 at its rear end and another circular disc 60. The flange 58 and disc 60 have coaxial openings which are smaller in diameter than the diameter of the active mirror 41. The active mirror 41 is arranged between spacer bars 62 and discs of heat resistant glass 64 and 66. The arrangement provides gaps 68 and 70 between the laser medium front surface and the glass plate 42 and between the semi-conductor converter 44 and the glass plate 66. These gaps are filled with the liquid solutions mentioned above which are circulated through the gaps between input ports 72 and 74 and an outlet port 76. The liquids are of the types mentioned above which both cool the active mirror and absorb the spontaneous and parasitic emissions. The liquid fills the spaces between the segments of the active medium in the layer 42. The active mirror is suspended by balls, suitably of glass having about the same index of refraction as the active medium layer 42. The liquid circulates through the interstices between the balls and also aids in cooling the edges of the active mirror. The suspension and mounting arrangement provided by the balls 78 is the subject matter of patent application Ser. No. 738,500 filed Oct. 11, 1976 in the name of Owen Lewis, et al, and assigned to the same assignee as this application. The bolts or screws which fasten the disc 60 to the ring 56 and assemble the arrangement together are not shown to simplify the illustration.

The converter 44 converts the radiation from the xenon flash lamps into essentially monochromatic output in the region of the band gap of the semi-conductor material of the converter 44. This band gap in the case of Ga Al As is 8000 to 9000 Å which overlaps a band where the active medium 42 of Nd:P$_5$O$_{14}$ is strongly absorptive. The heat generated is the quantum defect or energy difference between the 8000 to 9000 Å photons and the 1.05 to 1.06 micron photons. The converter minimizes this quantum defect. The conversion efficiency is high and little heat from the flashlamps passes into the thin active medium 42. It is preferable to drive the flashlamps at high current densities since the ultraviolet output increases substantially. This ultra-violet radiation is more efficient in pumping the absorption spectrum of the semi-conductor converter layer 44.

From the foregoing description it will be apparent that there has been provided improved laser apparatus which is highly efficient and is operable at high repetition rates, making it especially suitable for use in laser fusion systems. While various embodiments of the system have been described it will be appreciated that variations and modifications within the scope of the invention will become apparent to those skilled in the art. Accordingly the foregoing description should be taken as illustrative and not in any limiting sense.

What is claimed is:

1. In a laser system in which a beam of laser radiation is emitted, an active laser medium consisting of pentaphosphate (P$_5$O$_{14}$) doped at least with one rare earth element with a valence of three selected from the group consisting of N$_d$, P$_r$, H$_o$, E$_u$, E$_r$, S$_m$, T$_b$, D$_y$, and means for pumping said medium with radiation confined to wavelengths where said medium has strong absorption, said pumping means being an excimer laser and means for illuminating said medium with radiation from said excimer laser.

2. The invention as set forth in claim 1 wherein said excimer laser is an XeF laser.

3. The invention as set forth in claim 1 wherein said pumping means is at least one flashlamp which outputs radiation over a band including the ultraviolet, and means comprising a body of semi-conductor converter material for translating said flashlamp radiation into at least one of said wavelengths where said medium has strong absorption, said body of semiconductor converter material being in optical contact with said medium.

4. The invention as set forth in claim 3 wherein said semiconductor body consists of $Ga_nAl_{1-n}As$, where n is between 0 and 1.

5. The invention as set forth in claim 1 wherein the doping is from zero to about 40% by weight of said rare earth.

6. The invention as set forth in claim 1 wherein said mediums composition is $R^{+3}:P_5O_{14}$ where $R^{+3}$ is a rare earth having a valence of +3.

7. The invention as set forth in claim 1 wherein the composition of said medium is $Nd_xLa_{1-x}:P_5O_{14}$ where x corresponds to a range of Nd doping from 0-40% by weight.

8. The invention as set forth in claim 1 wherein said laser medium consists of $Nd:P_5O_{14}$.

9. The invention as set forth in claim 1 wherein said medium is a glass.

10. The invention as set forth in claim 1 wherein said medium is a crystal.

11. An active mirror laser system through which a beam of laser radiation passes twice, said active mirror comprising a slab providing a substrate which is transmissive to pumping radiation, a layer of active laser medium which passes said beam upon one face of said slab, said active laser medium consisting of pentaphosphate ($P_5O_{14}$) doped with at least one rare earth element with a valence of three selected from the group consisting of $N_d$, $P_r$, $H_o$, $E_u$, $E_r$, $S_m$, $T_b$, $D_y$, means for generating said pumping radiation for pumping said medium with radiation confined to wavelengths where said medium has strong absorption, and said pumping means being in optical contact with the opposite face of said slab.

12. The invention as set forth in claim 11 wherein said layer consists of an array of adjacent segments having spaces therebetween.

13. The invention as set forth in claim 12 including light absorbing material which is absorptive at the wavelengths of amplified spontaneous emission from said laser medium in said spaces.

14. The invention as set forth in claim 11 wherein said pumping means comprises at least one XeF laser which provides a pumping beam, and means for diverging said pumping beam over said opposite face of said slab.

15. The invention as set forth in claim 11 wherein said pumping means comprises a layer of semiconductor converter material on said opposite face of said slab, and an array of Xe flashlamps spaced from said opposite face.

16. The invention as set forth in claims 14 or 15 further comprising means for maintaining liquid for liquid cooling said active mirror in contact with the face of said active laser medium layer.

17. The invention as set forth in claim 16, wherein said active laser medium layer is in the form of a grid of adjacent segments which defines spaces between said adjacent segments, said liquid containing material absorptive at the wavelengths of amplified spontaneous emission from said active laser medium, said liquid filling said spaces.

* * * * *